(No Model.)

M. COUGHLIN.
CONNECTING ROD.

No. 592,487. Patented Oct. 26, 1897.

Witnesses.
Henry Drury
R. M. Kelly

Inventor.
Michael Coughlin
By
Attorney.

UNITED STATES PATENT OFFICE.

MICHAEL COUGHLIN, OF PHILADELPHIA, PENNSYLVANIA.

CONNECTING-ROD.

SPECIFICATION forming part of Letters Patent No. 592,487, dated October 26, 1897.

Application filed August 25, 1896. Serial No. 603,866. (No model.)

*To all whom it may concern:*

Be it known that I, MICHAEL COUGHLIN, of the city and county of Philadelphia and State of Pennsylvania, have invented an Improvement in Connecting-Rods, of which the following is a specification.

My invention has reference to connecting-rods; and it consists of certain improvements which are fully set forth in the following specification and are shown in the accompanying drawings, which form a part thereof.

The object of my invention is to provide a construction of pitman or connecting-rod for engines and other machinery which shall have capacity for automatic adjustment to compensate for any bent condition of the crank-pin or other defect in alinement or setting of the relative parts.

Heretofore in engines and machines employing pitmen or connecting-rods it frequently happens that the crank-pins are not true, or if true upon the crank or head are caused to run untrue relatively to the cross-head by the main shaft being out of alinement. This causes the brasses in the pitman or connecting-rod to bind and produce excessive wear, friction, heating, and ultimate pounding. It also frequently causes the pin to break. My invention overcomes all of the injurious effects due to these troubles or defects in construction.

In carrying out my invention I provide the connecting-rod or pitman with adjustable brasses at one or both ends. I also prefer in some cases to provide the brasses at one end with capacity for adjustment at right angles to the adjustment to the brasses at the other end.

My invention comprehends specific details of construction which will be fully understood from the accompanying drawings, which form a part thereof.

Figure 1:
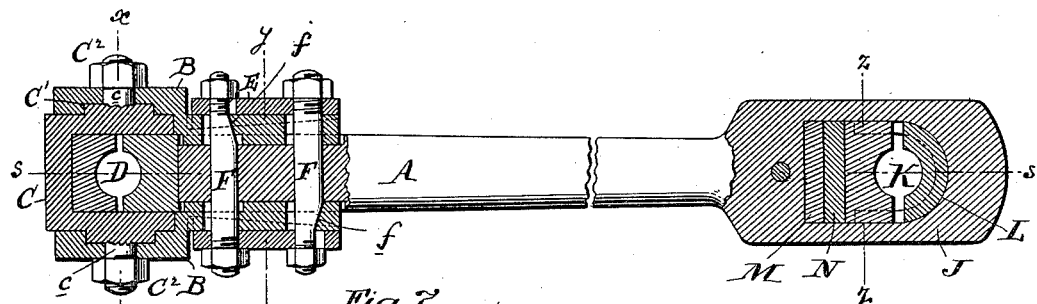
Figures 6, 7:
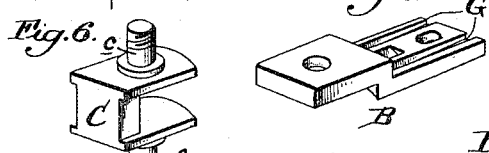
Figure 2:
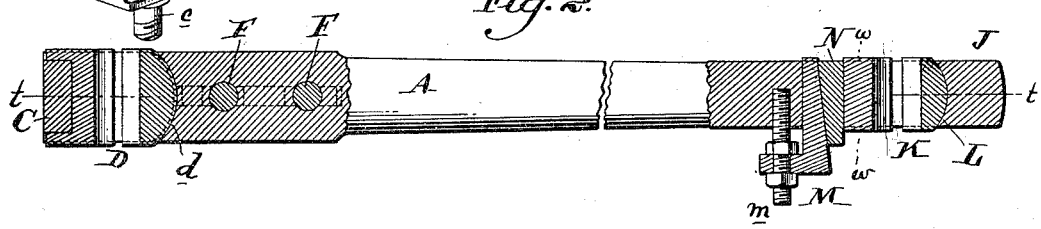
Figure 3:
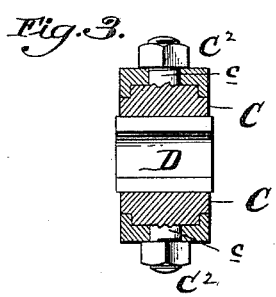
Figure 4:
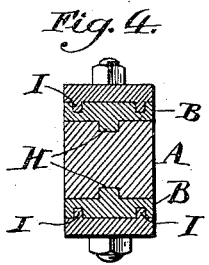
Figure 5:
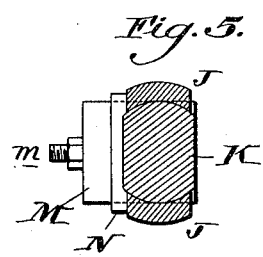

Figure 1 is a sectional side elevation of my improved pitman on line $tt$ of Fig. 2. Fig. 2 is a sectional plan view of same on line $ss$ of Fig. 1. Fig. 3 is a cross-section of same on line $xx$. Fig. 4 is a cross-section of same on line $yy$. Fig. 5 is a cross-section of same on line $zz$. Fig. 6 is a perspective view of a support for one of the brasses, and Fig. 7 is a perspective view of a portion of the head.

A is the connecting-rod or pitman. Secured to the end of the part A are end plates B B, which are fastened in place by bolts F F and clamping-plates E E. To properly center the plates B B upon the pitman-rod and hold them against lateral displacement while permitting of longitudinal adjustment, I provide the said plates with ribs or fins H, which fit into grooves or channels in the head of the rod. The outer faces of the plates B B are grooved, as at G, the bottoms of said grooves being inclined and deepest toward the end of the rod. The clamping-plates E E are provided with corresponding inclined ribs I, adapted to fit into the grooves or channels G, as clearly shown in Figs. 1 and 4. The bolts F F have one end formed with a beveled face $f$ to press against a corresponding edge on the plates B B. These bolts are extended through the parts to be clamped from opposite sides, so that the bevel $f$ of one bolt acts upon one plate B and the bevel of the other bolt acts upon the other plate B. By adjusting the nuts of these bolts they are caused to act as wedges to draw the plates B B backward upon the rod A. Simultaneously with this action the clamping-plates E E are drawn toward each other, and while clamping the plates B toward the rod A they also tend to hold the plates B B against longitudinal movement.

Journaled in the ends of the plates B B and movable between them is a box C having trunnions $c\,c$, which act as axes of oscillation. These trunnions $c$ are provided with nuts $c^2$ upon their ends for holding the plates B B and box C together. To remove in a large measure the strain from the trunnions $c$, I provide circular bearings C', which fit into circular recesses or bearings upon the inner or under surfaces of the plates B B, as shown in Figs. 1 and 3.

D are the brasses and are made in two parts, one of which fits to the box C and the other of which is made with a curved surface to fit a curved bearing $d$ in the end of the pitman-rod A, which is curved concentric with the trunnions $c$.

It will now be understood that the brasses can move upon the trunnions $c$ and bearings C' to compensate for any defect in alinement of the crank-pin. The brasses are adjusted to or from each other by the bolts F F, which action is produced by drawing the plates B and box C toward the rod.

The other end of the connecting-rod or pitman may be made in a similar manner or may be of any other construction. A form of construction especially adapted to cross-heads of engines I have shown as a preferred form. Referring to this, the end of the pitman is made loop-shaped and the upper, lower, and outer end of interior of the aperture is made curved, as shown at L, and to this the brasses K are fitted. The inner end of the brasses is made flat and receives a gib N, which is pressed toward the brass by a key M, fitting between the gib and pitman-rod. An adjusting-nut $m$ is employed for adjusting the key. As the brasses rest against a flat surface on the gib, it is evident that they may adjust themselves readily, turning upon the longitudinal axis of the pitman. This gives capacity for universal adjustment of the brasses and enables both ends of the pitman to compensate itself for lack of alinement of the crank and cross-head pin.

While I prefer the construction shown, I do not confine myself to the details thereof, as they may be modified without departing from the spirit of my invention.

What I claim as new, and desire to secure by Letters Patent, is as follows:

1. The combination of the pitman or rod, with transverse adjustable brasses at each end of the pitman or rod the brasses at one end being hinged to the pitman or rod on a transverse axis at right angles to the bearing and the box at the other end being fitted to the pitman or rod and movable upon a longitudinal axis.

2. The combination of the connecting-rod or pitman with brasses, a pivoted box or support for one of the brasses having its axis of oscillation at right angles to the journal-bearing of the brass and adjustably secured upon one end of the connecting-rod, a curved seat for the other brass formed in the end of the connecting-rod.

3. The combination of the connecting-rod or pitman with brasses, a pivoted box or support for one of the brasses having its axis of oscillation at right angles to the journal-bearing of the brass and adjustably secured upon one end of the connecting-rod, a curved seat for the other brass formed in the end of the connecting-rod and adjusting devices for moving the pivoted box or support to or from the curved seat.

4. The combination of the connecting-rod or pitman, with two independent end plates adjustably clamped to the rod to form a longitudinally-adjustable fork, a box pivoted between the plates upon transverse journals, and brasses carried by the box.

5. The combination of the connecting-rod or pitman, with two end plates adjustably clamped to the rod to form a fork, transverse clamping and adjusting bolts extending through the rod and respectively acting upon the plates to adjust and hold them longitudinally upon the rod, a box pivoted between the plates, and brasses carried by the box.

6. The combination of the connecting-rod or pitman, with two end plates adjustably clamped to the rod to form a fork, clamping-plates having wedge or inclined surfaces or parts for holding the end plates, transverse clamping and adjusting bolts extending through the rod and clamping-plates and respectively acting upon the plates to adjust and hold them longitudinally upon the rod, a box pivoted between the plates, and brasses carried by the box.

7. The combination of the connecting-rod or pitman, with two end plates adjustably clamped to the rod to form a fork and having ribs H, transverse clamping and adjusting bolts extending through the rod and respectively acting upon the plates to adjust and hold them longitudinally upon the rod, a box pivoted between the plates, and brasses carried by the box.

8. The combination of the rod A, end plates B, B, having ribs H, pivoted box C having journals in said end plates, and clamping-bolts F, F, having the inclined surfaces $f$ acting upon the plates, and brasses D between the box and end of the rod.

9. The combination of the rod A, end plates B, B, having ribs H, and grooves G having inclined bottoms, pivoted box C having journals in said end plates, clamping-plates E, E, each having inclined ribs I fitting into the grooves G, and clamping-bolts F, F, having the inclined surfaces $f$ acting upon the plates and extending through the clamping-plates, and brasses D between the box and end of the rod.

10. The combination of the rod A, the end plates B, B, adjustably secured to the rod and having circular bearings upon their extended ends, a box C having bearings C' adapted to said circular bearings, and brasses carried by said box.

11. The combination of the rod A having a curved seat $d$ in its end, the end plates B, B, adjustably secured to the rod and having circular bearings upon their extended ends, a box C having trunnions $c\ c$ and bearings C' adapted to said circular bearings, clamping-nuts C² for the screw-threaded trunnions $c$, and brasses carried by said box and extending to the curved seat in the rod.

12. The combination of the rod A, end plates B, B, brasses held to the end of the rod by the end plates and clamping and adjusting screws F, F, extending through the rod and having inclined or cam surfaces $f$ adapted to act respectively upon the end plates to move them longitudinally upon the rod for adjusting the brasses.

13. The combination of the rod A, end plates B, B, having grooves formed with inclined bottoms, brasses held to the end of the rod by the end plates, clamping-plates E, E, having inclined ribs I fitting the grooves, and clamping and adjusting screws F, F, extending through the rod and clamping-plates and having inclined or cam surfaces $f$ adapted to act respectively upon the end plates to move them longitudinally upon the rod for adjusting the brasses.

14. In a pitman or connecting-rod, the combination of the rod, with brasses at each end provided with parallel transverse holes or bearings and pivoted or journaled to the rod the brasses on one end being pivoted or journaled at right angles to the length of the rod and those at the other end being pivoted upon an axis parallel to the length of the rod and transversely to the hole or bearing.

15. The combination of the pitman-rod, with brasses secured to the end thereof and provided with a transverse hole or bearing always maintained at right angles to the length of the pitman and journaled upon a longitudinal axis whereby the brasses rotate only upon an axis parallel with the length of the rod and means to hold the brasses against movement except at right angles to the length of the pitman.

16. The combination of the pitman-rod, split brasses secured to the end thereof by a journal permitting rotating motion only on a longitudinal axis whereby the bearing therein is always maintained at right angles to the length of the pitman, and a gib and key device fixed to the pitman and having a movable joint with the brasses for adjusting the brasses to compensate for wear and holding them against movement excepting transversely to the length of the pitman.

17. The combination of the rod A having looped end J, brasses K movable within said looped end about a longitudinal axis only, a gib N fitted transversely to the pitman-rod and directly acting upon the brasses, and a key M for adjusting the gib.

In testimony of which invention I have hereunto set my hand.

MICHAEL COUGHLIN.

Witnesses:
 R. M. HUNTER,
 WM. L. EVANS.